F. W. STANTON.
SYRINGE.
APPLICATION FILED MAR. 14, 1921.
1,412,976.
Patented Apr. 18, 1922.
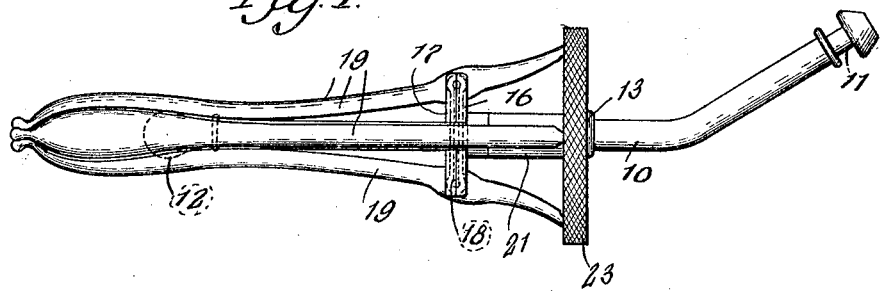
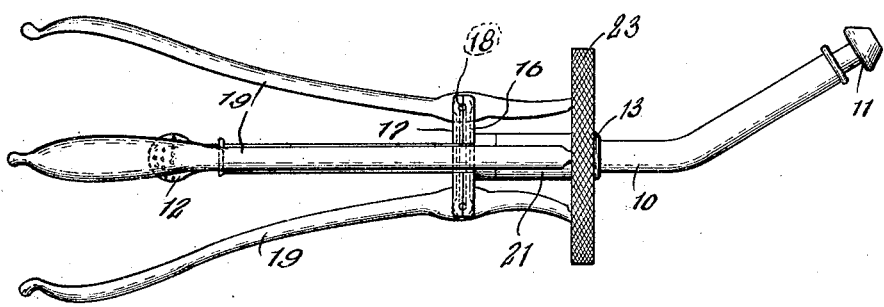
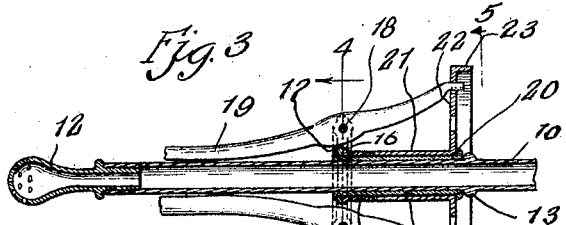
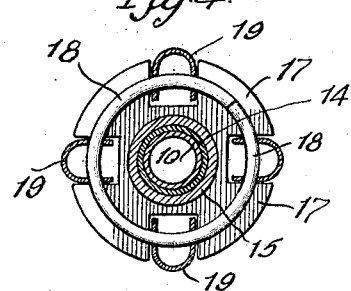

UNITED STATES PATENT OFFICE.

FREDERICK W. STANTON, OF CHICAGO, ILLINOIS.

SYRINGE.

1,412,976.   Specification of Letters Patent.   Patented Apr. 18, 1922.

Application filed March 14, 1921. Serial No. 451,950.

*To all whom it may concern:*

Be it known that I, FREDERICK W. STANTON, a citizen of the United States, and resident of Chicago, in the county of Cook and State of Illinois, have invented certain new and useful Improvements in a Syringe, of which the following is a specification.

My invention relates to syringes and particularly to a novel device adapted to be economically constructed and simply operated.

One of the principal objects of the present invention is to simplfy the manufacture of devices of this sort and so to combine the parts that the possibility of disarrangement is eliminated. The device here disclosed is further characterized by the provision of a simple operating mechanism for the arms, the parts being arranged for positive movement in each direction. This eliminates the necessity for springs and assures effective action under all conditions.

The invention will be more readily understood by reference to the accompanying drawings, in which, Fig. 1 is a side elevation of a device constructed in accordance with my invention;

Fig. 2 is a similar view showing the arms distended;

Fig. 3 is a fragmentary longitudinal sectional view;

Fig. 4 is a sectional view on the line 4—4 of Fig. 3; and,

Fig. 5 is a sectional view on the line 5—5 of Fig. 3.

In the drawings it will be seen that the device comprises a metallic tube 10, having means 11, adapting it to be attached to a rubber hose. At its outer extremity it may be provided with a spray nozzle 12. The tube is provided with a peripheral flange or rib 13 and between this flange and the extremity of the tube is mounted a sleeve 14 within which the tube may slide, thus varying the effective length of the tube relative to the distending mechanism. Upon the sleeve 14, and rigidly secured thereto, is a collar 15 having a notched lateral flange, the notches providing ears 16. A similarly notched disk 17 is mounted upon the projecting end of the collar 15, the end being riveted over to hold the disk in place. Each of the parts 16, 17, is provided with a shallow groove within which a wire or ring-shaped element 18 is seated. This wire engages and serves as a pivot for the four arms 19, shown in Figs. 1 and 2, the outer ends of which are suitably shaped to perform the desired function. These arms are preferably of U-shape in cross-section, as best shown in Fig. 4, and fit within the notches formed in the parts 16, 17. By employing this fastening device I am able to simplify the matter of manufacture by eliminating a plurality of small pivot pins or screws.

Also mounted on the sleeve 14, and between the collar 15 and a terminal flange 20, is a cylinder 21 having as a part thereof a disk 22, provided with a peripheral flange 23. The edge of the flange may be knurled or roughened as desired. In the body of the disk I provide four helical slots 24, arranged as shown in Fig. 5 and adapted to receive the rear ends 25 of the arms. The formation of the helical slots in the disk serves to provide in effect a plurality of cams by means of which the arms are oscillated on their pivots and caused to move inwardly and outwardly in unison following a partial rotation of the disk 22.

This construction results in a device which is positive in its operations, which may be very cheaply and advantageously constructed and which will be found to be entirely practical in service. The channel-shaped arms and the generally open construction of the parts, including the disk 22, enables the ready escape of fluid ejected through the spray nozzle.

Obviously the construction is capable of much modification and I do not wish to be limited except as indicated in the appended claims.

I claim:

1. In a syringe, the combination of a spraying tube, a sleeve thereon, a pair of flanges extending laterally from said sleeve, said flanges meeting at their outer peripheral edges and having channels therein to form an enclosed annular chamber therebetween, said flanges being notched, arms mounted in said notches, and a wire held in said enclosed chamber between said flanges and adapted to provide a pivot for said arms.

2. In a syringe, the combination of a spraying tube, a sleeve thereon, a pair of flanges extending laterally from said sleeve, said flanges meeting at their outer peripheral edges and having registering annular grooves back of said meeting edges to provide an enclosed annular chamber, said flanges being notched, arms mounted in said notches, and a wire ring held in said enclosed chamber between said flanges and passing through apertures in said arms to provide a pivot for said arms.

Signed at Indianapolis, Indiana, this 10th day of March, 1921.

FREDERICK W. STANTON.